United States Patent
Mithal et al.

(10) Patent No.: US 10,379,912 B2
(45) Date of Patent: Aug. 13, 2019

(54) DATA STORAGE ALLOCATION UTILIZING VIRTUAL MACHINE RESOURCE ALLOCATION

(71) Applicant: International Business Machines Corporation, Armonk, NY (US)

(72) Inventors: Akshat Mithal, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/484,254

(22) Filed: Apr. 11, 2017

(65) Prior Publication Data
US 2018/0292996 A1 Oct. 11, 2018

(51) Int. Cl.
*G06F 3/06* (2006.01)
*G06F 9/50* (2006.01)

(52) U.S. Cl.
CPC ............ *G06F 9/5077* (2013.01); *G06F 3/061* (2013.01); *G06F 3/0647* (2013.01); *G06F 3/0685* (2013.01)

(58) Field of Classification Search
CPC . G06F 3/06; G06F 9/50; G06F 3/0608; G06F 9/5077; G06F 3/0655; G06F 3/0688; G06F 3/0631
USPC .................................................. 711/103, 102
See application file for complete search history.

(56) References Cited

U.S. PATENT DOCUMENTS

| | | | |
|---|---|---|---|
| 7,877,754 B2 * | 1/2011 | Birkestrand | G06F 9/5072 718/104 |
| 8,793,373 B2 | 7/2014 | Nakama | |
| 8,918,613 B2 | 12/2014 | Kato et al. | |
| 8,954,671 B2 | 2/2015 | Maki et al. | |
| 8,984,221 B2 | 3/2015 | Satoyama et al. | |
| 9,015,412 B2 | 4/2015 | Miwa et al. | |
| 9,274,851 B2 | 3/2016 | Cheung et al. | |
| 9,619,149 B1 * | 4/2017 | Cummins | G06F 12/1018 |
| 2012/0246438 A1 * | 9/2012 | Aronovich | G06F 11/3485 711/172 |
| 2013/0124780 A1 * | 5/2013 | Baderdinni | G06F 3/061 711/103 |
| 2015/0153961 A1 | 6/2015 | Satoyama et al. | |

* cited by examiner

*Primary Examiner* — David Yi
*Assistant Examiner* — Zubair Ahmed
(74) *Attorney, Agent, or Firm* — Francis Lammes; Stephen J. Walder, Jr.; Wenjie Li

(57) ABSTRACT

A mechanism is provided for allocating data storage utilizing virtual machine resource allocation. Information pertaining to resource allocation to a set of partitions in a logically partitioned data processing system is gathered and analyzed to generate resource allocation based storage information for each partition in the set of partitions in the logically partitioned data processing system. For each partition in the set of partitions in the logically partitioned data processing system, a storage partition is generated in one or more faster storage tiers at a ratio according to the resource allocation based storage information associated with that partition. For each partition in the set of partitions in the logically partitioned data processing system, data is migrated between one or more slower storage tiers and the one or more faster storage tiers utilizing associated storage partitions in the one or more fastest storage tiers.

14 Claims, 4 Drawing Sheets

DATA STORAGE ALLOCATION UTILIZING VIRTUAL MACHINE RESOURCE ALLOCATION

BACKGROUND

The present application relates generally to an improved data processing apparatus and method and more specifically to mechanisms for data storage allocation utilizing virtual machine resource allocation.

An information system (IS) is any organized system for the collection, organization, storage, and communication of information. Recently, information systems have been utilized in a wide variety of regions. Data that is stored in the information systems may be arranged in file units with suitable input/output (I/O) performance to enable processing to be completed within a target time at least for high priority applications. Currently, the technology utilized to enable the processing to be completed within the target time is referred to as tiered storage control, whereby, if storage devices comprise storage areas exhibiting a plurality of different characteristics (I/O performance, reliability, or the like), data is placed in any of the plurality of tiered storage. Where the data is stored within the tiered storage depends on the frequency with which the computer system accesses the data. Thus, data requiring high I/O performance is typically arranged in high I/O performance tiered storage and data that is accessed infrequently is arranged in a lower I/O performance tiered storage.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for allocating data storage utilizing virtual machine resource allocation. The illustrative embodiment gathers information pertaining to resource allocation to a set of partitions in a logically partitioned data processing system. The illustrative embodiment analyzes the information to generate resource allocation based storage information for each partition in the set of partitions in the logically partitioned data processing system. For each partition in the set of partitions in the logically partitioned data processing system, the illustrative embodiment generates a storage partition in one or more faster storage tiers at a ratio according to the resource allocation based storage information associated with that partition. For each partition in the set of partitions in the logically partitioned data processing system, the illustrative embodiment migrates data between one or more slower storage tiers and the one or more faster storage tiers utilizing associated storage partitions in the one or more fastest storage tiers.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
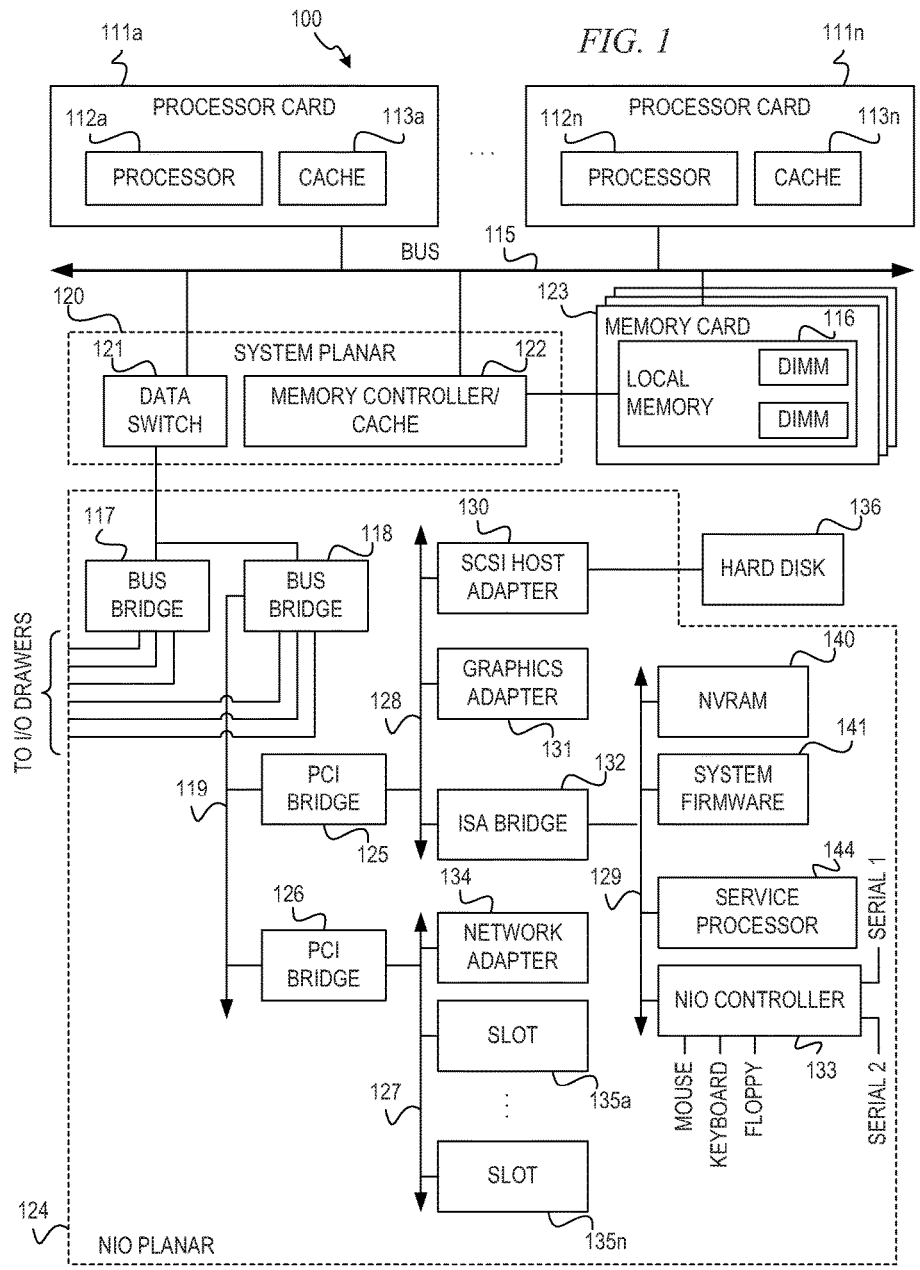
FIG. 1 depicts a block diagram of a data processing system with which aspects of the illustrative embodiments may advantageously be utilized.

The illustrative embodiments provide mechanisms for data storage allocation utilizing virtual machine resource allocation. As noted above, the technology utilized to enable the processing to be completed within the target time is referred to as tiered storage control, whereby, data requiring high I/O performance is typically arranged in high I/O performance tiered storage and data that is accessed infrequently is arranged in a lower I/O performance tiered storage. However, in logically partitioned data processing systems, storage tiering is performed without regard to the partitioning of resources performed by the platform firmware allocating the resources. For example, in a logically partitioned data processing system comprising four logical partitions, hereinafter referred to as virtual machines (VMs), the platform firmware allocates central processing unit (CPU) shares in the following exemplary fashion: {VM-A: 40%}, {VM-B:30%}, {VM-C:20%}, and {VM-D:10%}. In this example, the four VMs utilize a storage array with the capability to provide auto-tiering by using at least hard disk drives (HDDs), magnetic drives, solid state drives (SSDs), Flash arrays, or the like. If all of the VMs are issuing I/O commands, more frequently utilized data corresponding to all VMs are moved to the faster storage tier (i.e. SSDs, Flash arrays, or the like) without regard to resource allocation, such as the CPU resource allocation exemplified previously. Thus, if there are 120 extents (i.e. contiguous areas of storage) available in the faster storage tier, as per existing solutions available, the extents are distributed equally, i.e. 30 extents to each of VM-A, VM-B, VM-C, and VM-D. However, since VM-D only has a CPU resource allocation capped at 10%, VM-D cannot derive as much benefit from data in the faster storage tier as VM-A because VM-A has a higher allocation of CPU resources, i.e. a CPU resource allocation of 40%.

The illustrative embodiments provide mechanisms for data storage allocation utilizing virtual machine resource allocation. Due to the ability to partitioned resources, the mechanisms provide for optimal allocation of data to faster storage tiers utilizing the resources allocation to each VM. For example, the mechanisms read obtain the resource allocations to each VM, such as CPU allocation, memory unit allocation, non-volatile RAM (NVRAM) storage allocation, I/O adapter allocation, or the like. Then, based on one or more of the resource allocations, the mechanisms allocate storage tier access accordingly. For example, using the CPU allocation above of: {VM-A:40%}, {VM-B:30%}, {VM-C:20%}, and {VM-D:10%}, the mechanisms allocate the 120 extents of the faster storage tier with an appropriate proportion of 4:3:2:1, such that VM-A is allocated 48 extents, VM-B is allocated 36 extents, VM-C is allocated 24 extents, and VM-D is allocated 12 extents out of 120 extents of the faster storage tier. Hence, when the demand for I/O operations from all 4 VMs goes up, the most optimal I/O operation performance is delivered by allocating extents in that ratio.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
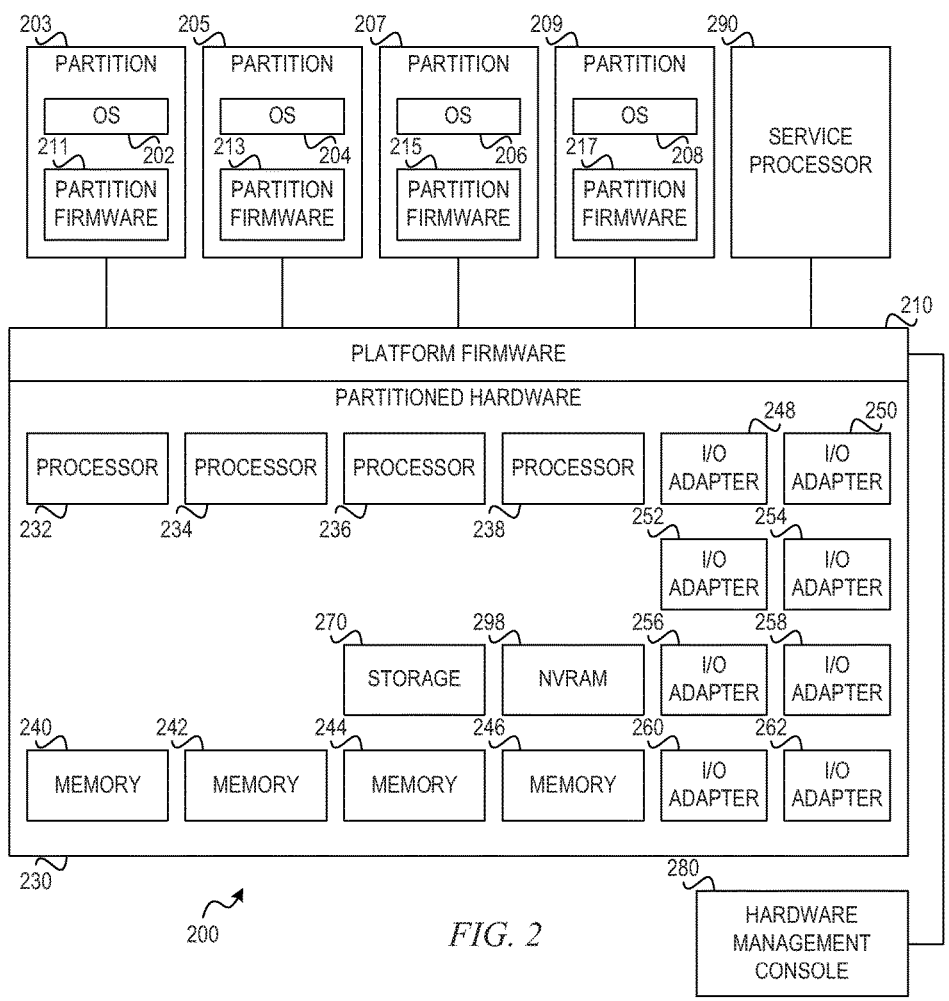
FIG. 2 is a block diagram of an exemplary logical partitioned platform in which exemplary aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system with which aspects of the illustrative embodiments may advantageously be utilized. As shown, data processing system 100 includes processor cards 111a-111n. Each of processor cards 111a-111n includes a processor and a cache memory. For example, processor card 111a contains processor 112a and cache memory 113a, and processor card 111I n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN), a wide-area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, the data processing system may be specifically configured to implement a mechanism for data storage allocation utilizing virtual machine resource allocation. The configuring of the data processing system may comprise the providing of application specific hardware, firmware, or the like to facilitate the performance of the operations and generation of the outputs described herein with regard to the illustrative embodiments. The configuring of the data processing system may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates data storage allocation utilizing virtual machine resource allocation.

As noted above, the mechanisms of the illustrative embodiments utilize specifically configured data processing systems to perform the operations for data storage allocation utilizing virtual machine resource allocation. These data processing systems may comprise various hardware elements which are specifically configured, either through hardware configuration, software configuration, or a combination of hardware and software configuration, to implement one or more of the systems/subsystems described herein.

FIG. 2 is a block diagram of an exemplary logical partitioned platform in which exemplary aspects of the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and platform firmware 210. Operating systems 202, 204, 206, and 208 may be multiple copies of a single operating system or multiple heterogeneous operating systems simultaneously run on platform 200. These operating systems may be implemented using the AIX® operating system, the IBM i™ operating system or the Linux™ operating system, for example, which are designed to interface with server firmware. Operating systems 202, 204, 206, and 208 are located in partitions 203, 205, 207, and 209.

Additionally, these-partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the firmware's partition manager. The processors associated or assigned to the partitions are then dispatched to the partition's memory to execute the partition firmware.

Partitioned hardware 230, which may or may not reside directly within data processing system 200, includes a plurality of processors 232-238, a plurality of system memory units 240-246, a plurality of input/output (I/O) adapters 248-262, and a storage system 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Platform firmware 210 performs a number of functions and services for partitions 203, 205, 207, and 209 to create and enforce the partitioning of logical partitioned platform 200. Platform firmware 210 is a firmware implemented virtual machine identical to the underlying hardware. Hypervisor software is an example of platform firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, platform firmware 210 allows the simultaneous execution of independent operating system images 202, 204, 206, and 208 by virtualizing all hardware resources of logical partitioned platform 200. Virtualization is the pooling of information technology resources in a way that shields the physical nature and boundaries of those resources from users.

Operations of the different partitions may be controlled through a hardware management console, such as hardware management console 280. Hardware management console 280 is a separate data processing system from which a system administrator may perform various functions including reallocation of resources to different partitions. Alternatively, a Virtual Partition Manager is a feature of the IBM i™ V5R3 operating system that allows one to create and manage one operating system logical partitions by initiating a console session using service tools.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system other than the data processing system mentioned previously without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like in which logical partitions (i.e. virtual machines) may operate. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation. As such, the computing device shown in FIG. 2 becomes specifically configured to implement the mechanisms of the illustrative embodiments and specifically configured to perform the operations and generate the outputs described hereafter with regard to data storage allocation utilizing virtual machine resource allocation.

Figure 3:
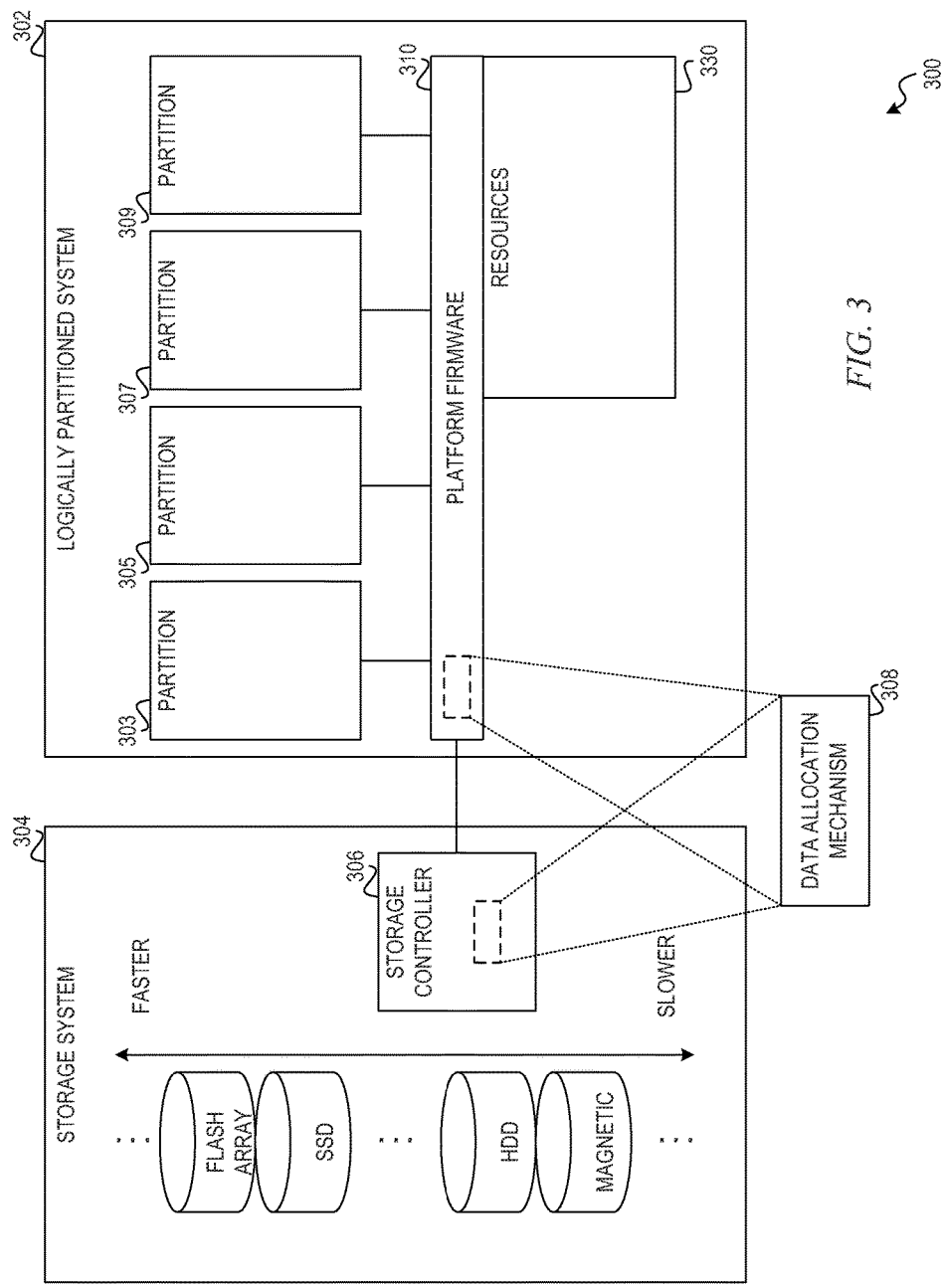
FIG. 3 depicts an exemplary functional block diagram of a mechanism that allocated data storage utilizing virtual machine resource allocation information in accordance with an illustrative embodiment.

FIG. 3 depicts an exemplary functional block diagram of a mechanism that allocated data storage utilizing virtual machine resource allocation information in accordance with an illustrative embodiment. Data processing system 300 comprises logically partitioned platform 302 and storage system 304. Identical to the logically partitioned system 200 of FIG. 2, logically partitioned system 302 comprises a set of partitions 303, 305, 307, and 309 and platform firmware 310. Platform firmware 310 performs a number of functions and services for partitions 303, 305, 307, and 309 to create and enforce the partitioning of logical partitioned platform 302 has partitioned resources 330 such as a plurality of processors, a plurality of system memory units, a plurality of input/output (I/O) adapters, and, in this example, storage system 304.

Storage system 304 is a storage system that comprises many different types of storage mediums such as, for example, hard disk drives (HDDs), magnetic drives, solid state drives (SSDs), Flash arrays, or the like. Storage controller 306 within storage system 304 employs automated storage tiering that, over time, dynamically migrates frequently accessed extents to a faster storage tiers, such as the SSDs, Flash arrays, or the like, and keeps less frequently accessed extents to slower storage tiers, such as the HDDs, magnetic drives, or the like. That is, storage controller 306 comprises automated storage tiering code that monitors input/output (I/O) operation patterns on all volumes of the storage mediums made up of hard disk drives (HDDs), magnetic drives, solid state drives (SSDs), Flash arrays, or the like. For those ones of the storage mediums that storage tiering, then based on high frequency of data access per extent, storage controller 306 migrates data from slower storage tiers to faster storage tiers when data is frequently accessed and from faster storage tiers to slower storage tiers when data is less frequently accessed.

Data processing system 300 also comprises data allocation mechanism 308 which may be a plug-in that resides within storage controller 306 or platform firmware 310, or is a standalone mechanism that operates in conjunction with storage controller 306 and platform firmware 310. Data allocation mechanism 308 gathers information about resource allocation from platform firmware 310, such as processor allocation, memory allocation, I/O adapter allocation, network bandwidth allocation or the like. Data allocation mechanism 308 analyzes the information to generate resource allocation based storage information and passes resource allocation based storage information to storage controller 306 for use in migrating data between the faster storage tiers and the slower storage tiers. Utilizing the resource allocation based storage information, storage controller 306 partitions data allocations associated with partitions 303, 305, 307, and 309 in the faster storage tiers accordingly.

For example, in previous storage allocation methodologies, storage controller 306 only servicing partitions 303, 305, 307, and 309 would allocate the 1600 extents of the SSD in storage system 304 with 400 extents being allocated to partition 303, 400 extents being allocated to partition 305, 400 extents being allocated to partition 307, and 400 extents being allocated to partition 309. If each of partitions 303, 305, 307, and 309 each perform heavy I/O operations, using current methodologies, storage controller 306 migrates data associated with those I/O operations from the slower storage tiers to the faster storage tiers. However, in accordance with the illustrative embodiments, data allocation mechanism 308 gathers information from platform firmware 310 that: partition 303 has been allocated 40% of resources 330, partition 305 has been allocated 30% of resources 330, partition 307 has been allocated 20% of resources 330, and partition 309 has been allocated 10% of resources 330. Thus, since partition 304 is operating using 30% more resources that partition 309, the 400 extents allocated to partition 303 will fill faster than the 400 extents allocated to partition 309.

Therefore, in accordance with the illustrative embodiments, storage controller 306 utilizes the resource allocation based storage information provided by data allocation mechanism 308 in allocating extents in faster storage tiers, such as SSDs, Flash arrays, or the like, based on a ratio of allocated resources identified in the resource allocation based storage information. For example, utilizing a SSD with 1600 extents and resource allocation based storage information identifying that partition 303 has been allocated 40% of resources 330, partition 305 has been allocated 30% of resources 330, partition 307 has been allocated 20% of resources 330, and partition 309 has been allocated 10% of resources 330, storage controller 306 determines a number of extents within the SSD to allocation to each partitions 303, 305, 307, and 309 based on identified resource allocation based storage information using the following: Extents distribution to each partition=total extents*% of resources allocated.

Thus, for partition 303 storage controller 306 would allocate 1600*0.40=640 extents, for partition 305 storage controller 306 would allocate 1600*0.30=480 extents, for partition 307 storage controller 306 would allocate 1600*0.20=320 extents, and for partition 309 storage controller 306 would allocate 1600*0.10=160 extents. Utilizing the storage allocation of the illustrative embodiments, storage controller allocates partition 303 an additional 60% extents [(640−400)/400], which enables partition 303 derive more I/O operations and bandwidth from storage controller 306 until the resource allocation in logically partitioned system 302 is expensed. Additionally, storage controller allocates partition 309 60% less extents [(400−160)/400], which is sufficient since partition 309 is only allocated 10% of the available resources on logically partition system 302. Therefore, by storage controller 306 utilizing resource allocation as a weight while making the decision to move extents from slower storage tiers to faster storage tiers lower tiers results in better utilization of faster performing and expensive storage tiers with respect to I/O operations, latency, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
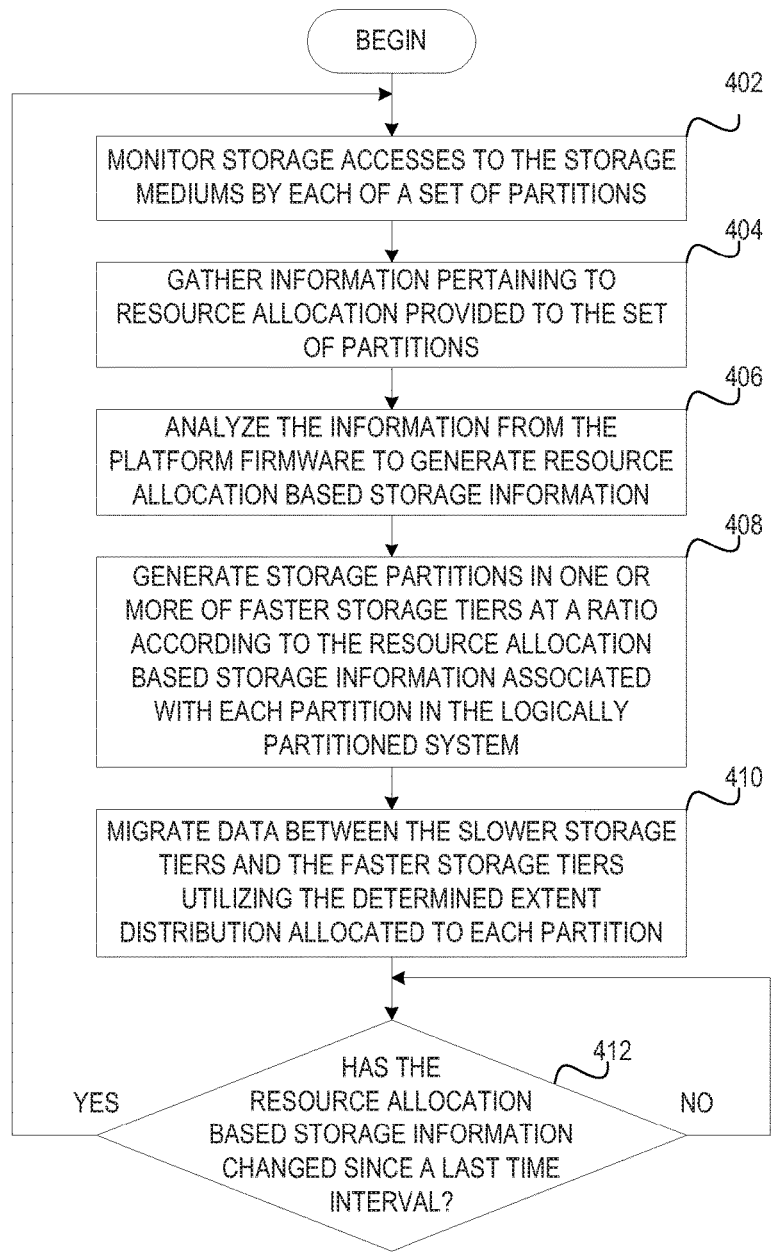
FIG. 4 depicts an exemplary flowchart of the operations performed in allocated data storage utilizing virtual machine resource allocation information in accordance with an illustrative embodiment.

FIG. 4 depicts an exemplary flowchart of the operations performed in allocated data storage utilizing virtual machine resource allocation information in accordance with an illustrative embodiment. As the operation begins, a storage controller responsible for managing a set of storage mediums such as, for example, hard disk drives (HDDs), magnetic drives, solid state drives (SSDs), Flash arrays, or the like, monitors storage accesses (i.e. input/output (I/O) operation patterns) to the storage mediums by each of a set of partitions (i.e. virtual machines (VMs)) in a logically partitioned data processing system (step 402). A data allocation mechanism operating in conjunction with the storage controller and platform firmware within the logically partitioned data processing system gathers information pertaining to resource allocation provided by the platform firmware to the set of partitions (step 404). The resources allocated by the platform firmware to each partition in the set of partitions may comprise a plurality of processors, a plurality of system memory units, a plurality of input/output (I/O) adapters, or the like.

The data allocation mechanism analyzes the information from the platform firmware to generate resource allocation based storage information (step 406). Using the resource allocation based storage information, the storage controller generates storage partitions in one or more of the faster storage tiers at a ratio according to the resource allocation based storage information associated with each partition in the logically partitioned system (step 408) such that, for each of the faster storage tiers and its associated partition in the logically partitioned data processing system:

Extents distribution to each partition=total extents*% of resources allocated. Therefore, by the storage controller utilizing resource allocation as a weight while making the decision to move extents from slower storage tiers to faster storage tiers lower tiers results in better utilization of faster performing and expensive storage tiers with respect to I/O operations, latency, or the like. Utilizing the storage accesses to the storage mediums by each of a set of partitions, the storage controller then migrates data between the slower storage tiers and the faster storage tiers utilizing the determined extent distribution allocated to each partition (step 410).

From step 410 a determination is made as to whether the resource allocation based storage information has changed since a last time interval (step 412). If at step 412 the resource allocation based storage information has not changed since the last time interval, the operation returns to step 412. If at step 412 the resource allocation based storage information has changed since the last time interval, the operation returns to step 402.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for data storage allocation utilizing virtual machine resource allocation. Utilizing the mechanisms, allocation to the faster storage tiers are performed optimally, such that the maximum benefit may be derived out of hot data placement by assigning larger portions of faster data tiers to partitions that have higher resource allocation. By allocation of hot data to the faster data tiers, optimal resource utilization within the logically partitioned data processing system is achieved by ensuring that larger chunks of faster storage tiers are allocated to partitions with higher resource allocations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments.

The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for allocating data storage utilizing virtual machine resource allocation, the method comprising:
   gathering, by a data allocation mechanism, information pertaining to resource allocation to each partition in a set of partitions in a logically partitioned data processing system, the resource allocation to each partition indicating the number of processors, system memory units, and input/output adapters allocated to the partition;
   analyzing, by the data allocation mechanism, the information to generate an allocated percentage of resources for each partition in the set of partitions in the logically partitioned data processing system;
   passing, by the data allocation mechanism, the allocated percentage of resources to a storage controller; and
   for each partition in the set of partitions in the logically partitioned data processing system:
      generating, by the storage controller, a storage partition in one or more faster storage tiers at a ratio according to the allocated percentage of resources associated with the partition, wherein each storage partition in each faster storage tier in the one or more faster storage tiers associated with each partition in the set of partitions in the logically partitioned data processing system is determined by multiplying a total of capacity of the faster storage tier by the allocated percentage of resources associated with the storage partition received from the data allocation mechanism; and
      migrating, by the storage controller, data between one or more slower storage tiers and the one or more faster storage tiers utilizing associated storage partitions in the one or more faster storage tiers generated by the storage controller.

2. The method of claim 1, wherein the gathering, analyzing, generating, and migrating steps are performed each time the resource allocation to the set of partitions changes in the logically partitioned data processing system.

3. The method of claim 1, wherein resources are allocated to each partition in the set of partitions by platform firmware in the logically partitioned data processing system.

4. The method of claim 1, wherein the slower storage tiers comprise at least one of hard disk drives (HDDs) and magnetic drives.

5. The method of claim 1, wherein the faster storage tiers comprise at least one of a solid state drives (SSDs) or Flash arrays.

6. A computer program product comprising a computer readable storage medium having a computer readable program stored therein, wherein the computer readable program, when executed on a computing device, causes the computing device to:
   gather, by a data allocation mechanism, information pertaining to resource allocation to each partition in a set of partitions in a logically partitioned data processing system, the resource allocation to each partition indicating the number of processors, system memory units, and input/output adapters allocated to the partition;
   analyze, by the data allocation mechanism, the information to generate an allocated percentage of resources for each partition in the set of partitions in the logically partitioned data processing system;
   pass, by the data allocation mechanism, the allocated percentage of resources to a storage controller; and
   for each partition in the set of partitions in the logically partitioned data processing system:
      generate, by the storage controller, a storage partition in one or more faster storage tiers at a ratio according to the allocated percentage of resources associated with the partition, wherein each storage partition in each faster storage tier in the one or more faster storage tiers associated with each partition in the set of partitions in the logically partitioned data processing system is determined by multiplying a total of capacity of the faster storage tier by the allocated percentage of resources associated with the storage partition received from the data allocation mechanism; and
      migrate, by the storage controller, data between one or more slower storage tiers and the one or more faster storage tiers utilizing associated storage partitions in the one or more faster storage tiers generated by the storage controller.

7. The computer program product of claim 6, wherein the gathering, analyzing, generating, and migrating steps are performed each time the resource allocation to the set of partitions changes in the logically partitioned data processing system.

8. The computer program product of claim 6, wherein resources are allocated to each partition in the set of partitions by platform firmware in the logically partitioned data processing system.

9. The computer program product of claim 6, wherein the slower storage tiers comprise at least one of hard disk drives (HDDs) and magnetic drives.

10. The computer program product of claim 6, wherein the faster storage tiers comprise at least one of a solid state drives (SSDs) or Flash arrays.

11. An apparatus comprising:
   a processor; and
   a memory coupled to the processor, wherein the memory comprises instructions which, when executed by the processor, cause the processor to:
   gather, by a data allocation mechanism, information pertaining to resource allocation to each partition in a set of partitions in a logically partitioned data processing system, the resource allocation to each partition indicating the number of processors, system memory units, and input/output adapters allocated to the partition;
   analyze, by the data allocation mechanism, the information to generate an allocated percentage of resources for each partition in the set of partitions in the logically partitioned data processing system;
   pass, by the data allocation mechanism, the allocated percentage of resources to a storage controller; and
   for each partition in the set of partitions in the logically partitioned data processing system:
      generate, by the storage controller, a storage partition in one or more faster storage tiers at a ratio according to the allocated percentage of resources associated with the partition, wherein each storage partition in each faster storage tier in the one or more faster storage tiers associated with each partition in the set of partitions in the logically partitioned data processing system is determined by multiplying a total of capacity of the faster storage tier by the allocated percentage of resources associated with the storage partition received from the data allocation mechanism; and migrate, by the storage controller, data between one or more slower storage tiers and the one or more faster storage tiers utilizing associated storage partitions in the one or more faster storage tiers generated by the storage controller.

12. The apparatus of claim 11, wherein the gathering, analyzing, generating, and migrating steps are performed each time the resource allocation to the set of partitions changes in the logically partitioned data processing system.

13. The apparatus of claim 11, wherein resources are allocated to each partition in the set of partitions by platform firmware in the logically partitioned data processing system.

14. The apparatus of claim 11, wherein the slower storage tiers comprise at least one of hard disk drives (HDDs) and magnetic drives and wherein the faster storage tiers comprise at least one of a solid state drives (SSDs) or Flash arrays.

* * * * *